United States Patent Office.

FRANK MARQUARD, OF NEWBURYPORT, MASSACHUSETTS.

Letters Patent No. 97,206, dated November 23, 1869.

IMPROVED COMPOSITION BOOT AND SHOE-HEEL.

The Schedule referred to in these Letters Patent and making part of the same

*To all persons to whom these presents may come:*

Be it known that I, FRANK MARQUARD, of Newburyport, of the county of Essex, and State of Massachusetts, have invented a new and useful Composition for the Manufacture of Boot and Shoe-Heels, or various other articles; and do hereby declare the said invention, and the mode of compounding it, to be fully described, as follows:

In carrying out my said invention, I combine together the following-named matters or ingredients, in or about in the proportions as hereinafter expressed. That is to say—

I take one hundred pounds of ground or comminuted leather, as old scraps or pieces of leather, for instance, which may or may not have been previously subjected to any alkaline solution. To such I add two and one-half pounds of vegetable fibre, such as flax, hemp, or other suitable equivalent. To these I add two gallons of animal or other proper oil, one gallon of glycerine, five pounds of albumen or gelatine, one-eighth of a pound of bichromate of potash, one-half a pound of sulphate of copper, and either one pound of extract of logwood or some other proper coloring-matter.

The said ingredients I thoroughly mix or incorporate together, and afterward suffer to dry, after which I reduce the mass to a fine powder, or in other respects as may be desired for use.

In making a heel or other article of the compound, a mould is to be employed, it being subjected to a heat of about 300° Fahrenheit, and after the mould has been properly charged with the compound, the latter is to be subjected to pressure, in order to consolidate it and cause it to thoroughly fill the mould.

In the place of the ground or comminuted leather, spent tan-bark may be substituted, or it may be used with the leather.

I do not intend to confine my invention to the precise proportions of the ingredients as hereinbefore set forth, as they may be somewhat varied without materially changing the character of the composition.

A heel made of the compound is very hard and durable.

I claim, as my invention—

The above-described composition, made of the materials and in the manner substantially as hereinbefore described.

Also, as an improved manufacture of my invention, a heel or other article, when made of such composition, by the use of a mould and heat and pressure, as set forth.

FRANK MARQUARD.

Witnesses:
    R. H. EDDY,
    S. N. PIPER.